(12) United States Patent
Klug et al.

(10) Patent No.: US 6,690,130 B2
(45) Date of Patent: Feb. 10, 2004

(54) WINDSHIELD WIPER SYSTEM

(75) Inventors: Hans-Georg Klug, Baden-Baden (DE); Gebhard Michenfelder, Lichtenau (DE); Hans Meier, Ottersweier (DE); Henry Blitzke, Buehl (DE); Michael May, Offenburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/864,986

(22) Filed: May 24, 2001

(65) Prior Publication Data

US 2001/0043047 A1 Nov. 22, 2001

Related U.S. Application Data

(63) Continuation-in-part of application No. 09/423,866, filed on Feb. 1, 2000.

(30) Foreign Application Priority Data

Mar. 19, 1998 (DE) .......................................... 198 11 941
Jun. 20, 1998 (DE) .......................................... 198 27 541

(51) Int. Cl.[7] ................................................. H02P 1/04
(52) U.S. Cl. ....................... 318/444; 318/250; 318/443; 318/483; 318/480
(58) Field of Search ........................... 318/444, DIG. 2, 318/250, 443, 483, 480

(56) References Cited

U.S. PATENT DOCUMENTS

| 4,317,073 | A | * | 2/1982 | Blaxzkowski | ................ 318/483 |
| 6,121,741 | A | * | 9/2000 | Berger et al. | ................ 318/483 |
| 6,218,741 | B1 | * | 4/2001 | Braun et al. | ................ 318/483 |

* cited by examiner

Primary Examiner—Karen Masih
(74) Attorney, Agent, or Firm—Michael J. Striker

(57) ABSTRACT

Operation of a windshield wiper system for cleaning a windshield of a motor vehicle includes driving at least one wiper by an electric drive motor so that the at least one wiper shifted between two terminal positions, processing by a control unit as the input variable the output signals of a rain quantity and the switching signals of a manually controllable switch mechanism, and processing as the output variable a supply voltage of the electric drive motor so as to control the wiper speed, operating the at least one wiper (8) with variable intermittent interval times and at variable wiper speeds, as a function of a rain quantity detected by the rain sensor (12), so that the precisely one wiper speed and precisely one intermittent interval time are associated with each measured rain quantity, and moving the at least one wiper (8) in an intermittent mode with a lower speed than in a continuous mode.

13 Claims, 2 Drawing Sheets

WINDSHIELD WIPER SYSTEM

CROSS REFERENCE IN A RELATED APPLICATION

This application is a continuation-in-part of patent application Ser. No. 09/423,866 filed on Feb. 1, 2000.

BACKGROUND OF THE INVENTION

The invention relates to a windshield wiper system and a method for operating a windshield wiper system.

Windshield wiper systems for cleaning motor vehicle windshields of this generic type are known. One disadvantage of known wiper systems is that when rain quantities are slight, a fine film of water remains on the window to be wiped, which is due primarily to an overly high wiper speed and which can impair the view for the driver. This is known as streaking and is dependent both on the degree of wetting of the window and on the wiper speed. The higher the wiper speed, the greater the tendency to streaking. Wiper systems with only one windshield wiper are especially critical with regard to streaking, because one wiper fundamentally has to sweep over the window markedly faster, if it is to produce the same cleaning action as two wipers.

Known windshield wiper systems usually have only two different wiper speeds and one intermittent position. In the intermittent position, the wiper speed is typically equivalent to the slower position in the continuous mode. The disadvantage then is that when only slight quantities of water are on the windshield, the slowest wiper speed is still too fast, and the wipers therefore tend to streaking.

Provisions for variable control of windshields wipers are known. German Patent DE 33 14 770 C2, for instance, shows a device for controlling a windshield wiper motor, whose action is based primarily on assessing measurement signals of an optical rain sensor such that when a certain minium rain quantity is measured, the windshield wiper is turned on. The wiper speed is also supposed to be capable of being reduced if only slight rain quantities are detected. Since for safety reasons (hindrance to vision for the driver) a minimum speed of the windshield wipers cannot be undershot, there is a gap between wiping at intermittent intervals and the lowest possible wiper speed in the continuous mode. Thus even in the subject of the invention of the aforementioned patent, the fundamental problem of streaking still exists.

Another known provision resides in continuous regulation of the wiper speed by means of a regulating device that is capable of processing the signals of a rain sensor, among other signals, as an input variable. Thus German Patent DE 197 00 457 C1 shows an apparatus and a method for a windshield wiper system in which a drive motor is regulated in such a way that its speed of revolution and thus the speed of the windshield wipers is variable depending on the input variable. Once again, however, an unambiguous quantitative association of certain detected rain quantities with certain wiper speeds is not provided. Thus once again the fundamental problem of streaking still exists.

SUMMARY OF THE INVENTION

In accordance with the present invention, in the windshield wiper system, the wiper is operatable with variable intermittent interval times and at variable wiper speeds as a function of a rain quantity, and precisely one intermittent interval time are associated with each measured rain quantity.

The windshield wiper system of the invention offers the advantage that streaking from an overly high wiper speed can be reliably avoided. This can be done by controlling the wiper motor by detecting a rain quantity, preferably with an optical rain sensor. An unambiguous association of each measured rain quantity with a certain wiper speed is preferred; at low rain quantities, the wiper is first operated in an intermittent mode, with variable intermittent interval times, and as the rain becomes stronger it is operated in a continuous mode with a variable wiper speed. In the intermittent mode the wiper operates with a lower speed than in the continuous mode. Controlling the direct-current motor that is typically used can be accomplished by either voltage regulation or by pulse width modulation (PWM), for instance.

By lowering the wiper speed in the intermittent mode to a relatively low value, streaking can be averted. Instead of changing immediately from an intermittent interval time of five seconds, for instance, to the continuous mode when the rain is relatively strong, it is initially advantageous to reduce the intermittent interval times, while the wiper speed remains constantly low. Reducing the intermittent interval time to a value of zero then corresponds to a continuous mode. It is only in the continuous mode that the wiper speed is increased accordingly as the rain quantity increases. The lowest wiper speed preferably has a minimum value, at which a driver still does not perceive the motion of the windshield wiper across his view as a hindrance to his vision. The adaptation to the different measured degrees of wetting of the window can be done either by continuously changing the speed of the drive motor, or in discrete stages.

In a preferred further feature of the invention, it is provided that the speed regulation of the at least one wiper has a fuzzy logic algorithm; as a result, given the fluctuations that necessarily occur in the output signals of an optical rain sensor, the wiper speed or the intermittent interval times can be reliably prevented from being subject to major transient fluctuations.

BRIEF DESCRIPTION OF THE DRAWINGS

The invention will be described in further detail below in an exemplary embodiment in conjunction with the associated drawings. Shown are.

DESCRIPTION OF THE PREFERRED EMBODIMENTS

Figure 1:
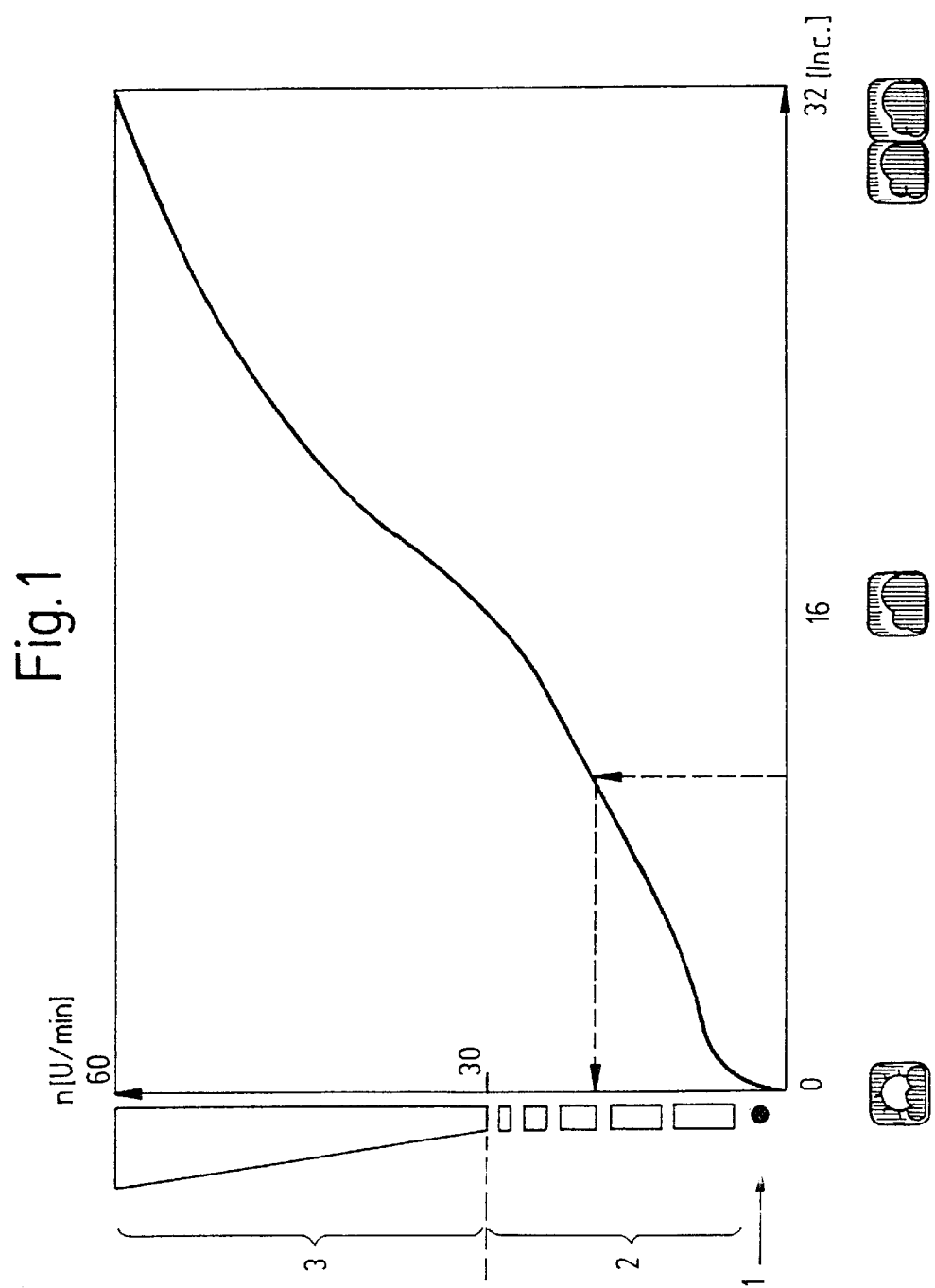
FIG. 1, a graph showing a relationship between the rain quantity and the wiper speed.

FIG. 1, in a graph, shows a relationship between a rain quantity, measured by a preferably optical rain sensor, and a wiper speed of a windshield wiper system of the invention. On the horizontal axis of the graph, the rain quantity detected by the rain sensor is plotted, and the speed of the wiper motor is plotted on the vertical axis.

The vertical axis is divided into three ranges 1, 2, 3, which characterized the three possible operating states of the windshield wiper system. The drive motor of the windshield wiper system is turned off in the first range 1 and in the second range 2 it can operate intermittently with variable intermittent interval times and a constant rpm. In the third range 3, the motor runs in the continuous mode, but at variable rpm, depending on the measured rain quantity. The third range 3 can also be characterized as an operating mode with an intermittent interval time having the value of zero.

As can be seen from the graph, precisely one wiper speed is associated with each measured rain quantity. Up to a medium rain quantity, the wiper motor initially runs in an intermittent mode, with the intervals becoming increasingly shorter as the rain quantity increases. At the last possible wiper speed of approximately 30 rpm, the intermittent interval times can vary here between five seconds and approximately one second. In this range, the graph shows a curve of constant slope, which means a linear relationship between the measured rain quantity and the increasingly shorter intermittent interval times.

In conventional wiper motors, a first speed is approximately 40 rpm, and a second speed is approximately 60 rpm. In the intermittent mode, the drive motor again operates in the first stage, which will hereinafter be called the rated speed. A rotational speed of the electric drive motor of 30 rpm, in the exemplary embodiment shown, thus corresponds to a speed lower than the rated speed. If the windows is more intensely wet, the drive motor can run faster than 40 rpm, which thus corresponds to a speed higher than the rated speed.

Beyond a certain rain quantity, the wiper changes to a continuous wiping mode (the intermittent interval time is zero), and once again an unambiguous relationship prevails between the measured rain quantity and the wiper speed. At the maximum detected rain quantity, the wiper motor then also runs at its maximum speed, which in the exemplary embodiment shown is approximately 30 rpm.

In the intermittent mode the wiper operates with a lower speed than in the continuous mode.

The following table shows an example of a relationship between a rain quantity, which is divided up in so-called increments from 0 (dry window) to 32 (maximum rain intensity) and the rotary speed (in revolutions per minute) of the drive motor of the windshield wiper system. The rotary speed values shown in the table can, depending on the control strategy employed, either be used as discrete staged values for the motor control or as mean values of a continuous, or in other words infinitely graduated, rpm adaptation.

| Rain quantity (Increments) | Rotary Speed (rpm) |
| --- | --- |
| 0 . . . 5 | 26 |
| 5 . . . 7 | 29 |
| 7 . . . 12 | 32 |
| 9 . . . 12 | 34 |
| 12 . . . 16 | 38 |
| 16 . . . 20 | 42 |
| 20 . . . 24 | 47 |
| 24 . . . 28 | 53 |
| 28 . . . 32 | 60 |

The table once again illustrates a slight nonlinearity, which can already be seen in the graph, in the relationship between the rain quantity and the speed of revolution of the drive motor. This nonlinearity is directed primarily to expediencies that are to be ascertained by trial and error, and it should appropriately be realized by either fixedly specified or user-variable programming.

Figure 2:
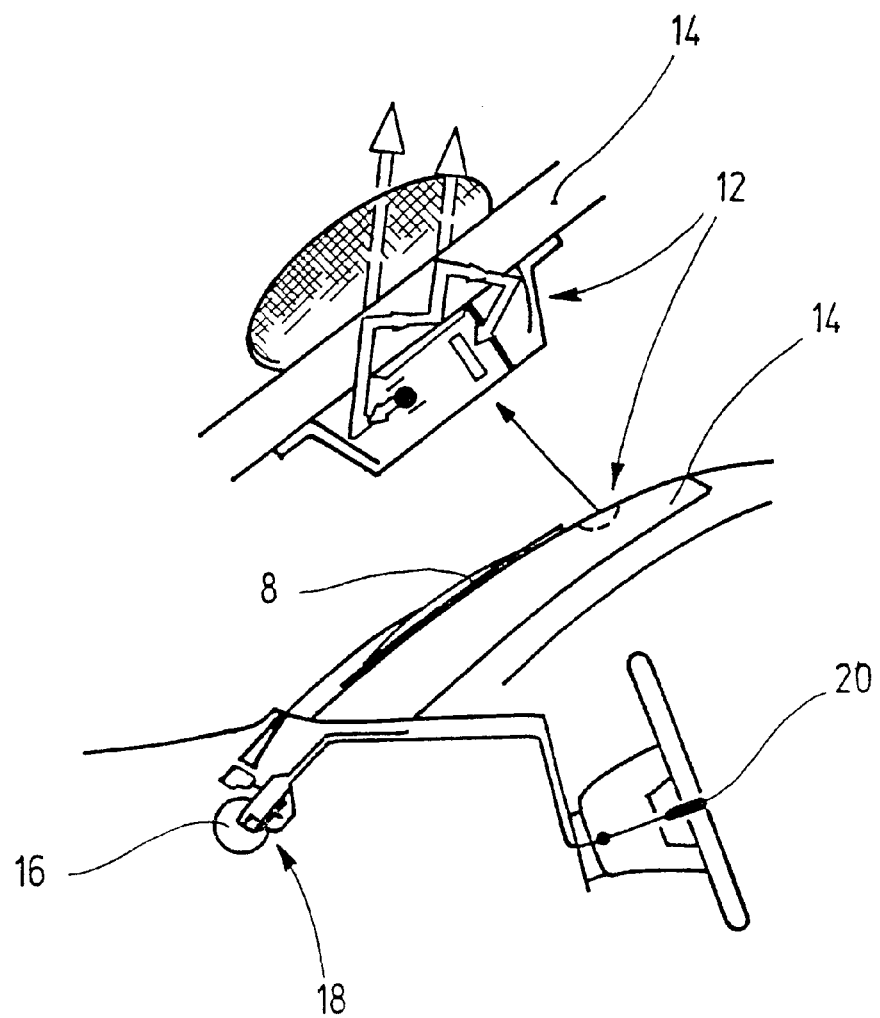
FIG. 2, an overall system of the windshield wiper system of the invention.

FIG. 2 shows an overall system according to the invention, with an optical rain sensor 12, known per se, that is mounted on the inside of a windshield 14 of a motor vehicle. The rain sensor 12 has an optical transmission-reception segment in which the light, coupled into the windshield 14 at an angle, is reflected totally by the outer, dry boundary face and strikes the angularly oriented receiver. Not until there are water droplets adhering to the outside of the windshield 14 does some of the light refract outward, because of an altered index of refraction of the boundary layer between glass and water, and attenuates the reception signal.

As a result, the rain sensor 12 influences the speed of an electric drive motor 16 for driving at least one windshield wiper 8 via a control or regulating electronic system 18 associated with the drive motor 16. A conventional steering wheel switch 20 can also be seen, so that the driver can manually preselect the wiper program he wants. With the steering wheel switch 20, one can for instance switch between two wiper speeds or an intermittent mode as well as the above-described automatic program. Instead of the steering wheel switch 20, the manual control of the wiper program desired can by means of a selector lever in a steering wheel, on the dashboard, or in some similar way.

Adjusting the rotary speed of the drive motor 16 can be done for instance by pulse with modulated triggering, which enables sensitive regulation by means of square supply voltage pulses of variable length. A fixed relationship between the voltage applied to the motor 16 and the resultant rpm can be seen from an individual motor characteristic curve.

What is claimed is:

1. A windshield wiper system for cleaning a windshield of a motor vehicle, comprising at least one wiper that can be shifted between two terminal positions and is driven by an electric drive motor, and having a control unit, which as an input variable processes the output signals of a rain sensor as well as the switching signals of a manually controllable switch means and as an output variable controls a supply voltage of the electric drive motor and thus a wiper speed, and as a function of a rain quantity detected by the rain sensor (2), the at least one wiper (8) can be operated with variable intermittent interval times and at variable wiper speeds, so that precisely one wiper speed and precisely one intermittent interval time are associated with each measured rain quantity, wherein the at least one wiper (8) is movable in an intermittent mode and in at least one continuous mode, and wherein the at least one wiper (8) moves in the intermittent mode with a lower speed than when operating in a slowest mode of said at least one continuous mode.

2. The windshield wiper system of claim 1, wherein if the rain quantity is low, the at least one wiper (8) runs in an intermittent mode, with a lower speed than a rated speed.

3. The windshield wiper system of claim 1, wherein when the rain quantity is low, the intermittent interval times become shorter with an increasing rain quantity.

4. The windshield wiper system of claim 1, wherein beyond a certain measured rain quantity, the at least one wiper can be operated in a continuous mode, at a lower speed than the rated speed.

5. The windshield wiper system of claim 1, wherein the at least one wiper (8), at a larger rain quantity, can be operated at a higher speed than the rated speed.

6. The windshield wiper system of claim 1, wherein a program for associating the wiper speeds with the measured rain quantities is stored in a read-only memory (ROM) of the control unit (18).

7. The windshield wiper system of claim 1, wherein the control of the electric drive motor (16) of the at least one wiper (8) is effected by means of pulse width modulation (PWM).

8. The windshield wiper system of claim 6, wherein the control of the electric drive motor (16) of the at least one wiper (8) is effected by means of a voltage regulation.

9. The windshield wiper system of claim 1, wherein the drive motor (16) operates in a reversing mode.

10. The windshield wiper system of claim 1, wherein the drive motor (16) is coupled to the at least one wiper (8) via a rod assembly.

11. The windshield wiper system of claim 10, wherein the drive motor (16) has only one direction of rotation.

12. The windshield wiper system of claim 1, wherein the speed control of the at least one wiper (8) has a fuzzy logic algorithm.

13. A method for operating a windshield wiper system for cleaning a windshield of a motor vehicle, comprising the steps of driving at least one wiper by an electric drive motor so that the at least one wiper shifted between two terminal positions, processing by a control unit as the input variable the output signals of a rain quantity and the switching signals of a manually controllable switch means, and processing as the output variable a supply voltage of the electric drive motor so as to control the wiper speed, operating the at least one wiper (8) with variable intermittent interval times and at variable wiper speeds, as a function of a rain quantity detected by the rain sensor (12), so that precisely one wiper speed and precisely one intermittent interval time are associated with each measured rain quantity, and moving the at least one wiper (8) in an intermittent mode with a lower speed than in a continuous mode.

* * * * *